United States Patent
Vecchio et al.

[15] 3,686,338

[45] Aug. 22, 1972

[54] PROCESS FOR THE PREPARATION OF CHLOROFLUORODERIVATIVES OF METHANE

[72] Inventors: Martino Vecchio, 33, Corso Sempione, Milan; Giancarlo Stefani, 11, via Matteotti, Bollate, both of Italy

[22] Filed: May 8, 1970

[21] Appl. No.: 35,918

[30] Foreign Application Priority Data

May 13, 1969 Italy.....................16761 A/59

[52] U.S. Cl..............................................260/653.8
[51] Int. Cl. ....C07c 17/10, C07c 17/20, C07c 19/08
[58] Field of Search...................................260/653.8

[56] References Cited

UNITED STATES PATENTS

| | | | |
|---|---|---|---|
| 1,914,135 | 6/1933 | Lacy | 260/653.8 |
| 2,739,989 | 3/1956 | Barringer et al. | 260/653.8 |
| 3,206,515 | 9/1965 | Olstowski et al. | 260/653.8 |

*Primary Examiner*—Daniel D. Horwitz
*Attorney*—Stevens, Davis, Miller & Mosher

[57] ABSTRACT

A process is disclosed for the preparation of chlorofluorinated methane derivatives by the reaction of a gaseous mixture consisting of (a) methane, chlorine and at least one halogenated hydrocarbon, or (b) carbon tetrachloride and said hydrocarbon, with solid calcium fluoride or with a calcium fluoride-containing substance, (e.g. fluorite) according to the fluid bed technique, wherein the solid calcium fluoride-containing substance is fed in the form of a suspension in at least a portion of the halogenated hydrocarbon, preferably consisting of at least one recycled reaction intermediate product, in the liquid state at a temperature between about 450° and 550° C. The halogenated hydrocarbon consists of one or more of the following halogenated hydrocarbons: $CCl_4$, $CHCl_3$, $CH_2Cl_2$, $CH_3Cl$, $CFCl_3$, $CHF_3$, $CF_2Cl_2$, $CF_3Cl$, $CHFCl_2$, $CHF_2Cl$, $C_2Cl_4$, $C_2Cl_6$, $C_2HCl_3$.

The calcium fluoride-containing solid substance is employed in finely divided form with at least 90 percent of its weight of a size lower than 50 microns.

7 Claims, No Drawings

PROCESS FOR THE PREPARATION OF CHLOROFLUORODERIVATIVES OF METHANE

The present invention relates to a process for preparing chlorofluorinated derivatives of methane and more particularly it relates to an improved process for the production of chlorofluorinated derivatives of methane starting from methane and chlorine and by using as the fluorine source calcium fluoride or calcium fluoride-containing substances (e.g., fluorite) in the presence of halogenated hydrocarbons.

The resulting chlorofluorinated derivatives of methane ($CFCl_3$, $CF_2Cl_2$, etc.) are important products which are of great industrial importance. Such products may be used, amongst other applications, in the field of the so-called aerosol technique and for making foamed products such as for instance urethane foams, as refrigerating liquids, as solvents, etc.

It is already known to prepare chlorofluoro-derivatives of methane by the reaction of $CCl_4$ with fluorine in a fluid bed. However, this technique, apart from the necessity of an available hydrocarbon that is already halogenated, has also the drawback of causing agglomeration and/or packing phenomena of the fluorite particles due to the $CaCl_2$ that forms during the reaction, and which phenomena are extremely detrimental to the satisfactory working of the fluid bed.

It is also well known to prepare chlorofluoro-derivatives of methane by reaction in gaseous phase of methane with chlorine/and a source of fluorine in the solid state, this latter being used according to the fluid bed technique.

In order to improve the fluidizing conditions of the bed there has been suggested the use of solid diluents admixed with the fluorine-containing material, for instance: coal, $SiO_2$ or $Al_2O_3$, but this actually introduces a further complication into the process.

Finally, for solving the problem of an improved fluidization of the fluid bed, there has also been suggested the use of homogeneously granulated fluorine-containing materials in the form of spheroidal particles, particularly suited for the use in a fluid bed, obtained by the spray-drying of a suspension of a fluoride in $H_2O$ containing small quantities of $CaCl_2$ as a binder. The pre-formed spheroidal particles thus obtained may be subsequently fed into a chlorofluorination reactor working according to the fluid bed technique.

Thus, an object of the present invention is to provide a still further improved process for the preparation of chlorofluoro-derivatives of methane by the reaction in the gaseous phase of a mixture consisting of methane and chlorine with calcium fluoride or with a calcium fluoride-containing substance (such as fluorite) in the solid state according to the fluid bed technique.

Another object of this invention is to provide a process for the preparation of chlorofluoro-derivatives of methane the thermal parameters of which are readily controllable, and that will allow high reaction rates while being simple to work and of good efficiency.

These and still other objects which will appear more clearly to the skilled in the art from the following description can be achieved, according to the present invention, through an improved process for the preparation of chlorofluoro-derivatives of methane by the reaction of a gaseous mixture consisting essentially of methane, chlorine and at least one halogenated hydrocarbon, or consisting essentially of carbon tetrachloride and said halogenated hydrocarbon, with solid calcium fluoride or with a calcium fluoride-containing substance, according to the fluid bed technique, at temperatures between 450° and 550° C., wherein the solid substance used which contains calcium fluoride and has a granulometry for at least 90 percent by weight below 50 microns, is fed into the reactor in the form of a suspension in at least a portion of the halogenated hydrocarbon in the liquid state, preferably consisting of at least one recycled reaction intermediate product.

By operating according to the present invention, because of the reaction between methane, chlorine and calcium fluoride, calcium chloride is formed which acts as binder on the particles fed in suspension, thereby facilitating the growth of the preexisting granules as well as the formation of new substantially spheroidal granules, particularly suited for a fluid bed.

The process may be carried out at temperature between 450° and 550° C., as already mentioned above, and with contact times of the gaseous phase with the calcium fluoride bed which may vary within wide limits, up to values around 60 seconds, since from these contact times largely depend both the formation and the size-distribution of the granules depend the fluid bed, as well as the conversion yield of the methane into the desired chlorofluoro-derivative.

The granulometry of the calcium fluoride fed is, in general, between 1 micron and 44 microns, for practical reasons in the grinding operation.

The calcium fluoride is employed in a substantially stoichiometric molar ratio, although an excess is not harmful for the process. The chlorine and the methane are introduced into the reactor at a molar ratio $Cl_2CH_4$ between 3.5 and 4.5.

The halogenated hydrocarbon is selected from the class consisting of the reactants, the intermediates, the products and by-products of the reaction containing from 1 to 2 carbon atoms. The halogenated hydrocarbons in question preferably consist of mixtures of two or more of the following compounds: $CCl_4$, $CHCl_3$, $CH_2Cl_2$, $CFCl_3$, $CHF_3$, $CF_2Cl_2$, $CF_3Cl$, $CHFCl_2$, $CHF_2Cl$, $C_2Cl_4$, $C_2Cl_6$, $C_2HCl_3$, etc.

The composition of the mixture of halogenated hydrocarbons, that is preferably recycled, may vary within wide limits, depending on the reaction conditions and in relation to the composition of the desired products. These halogenated hydrocarbons apparently do not partecipate in the reaction since they are found unaltered at the end of the process and may be recycled either continuously or intermittently according to the present invention.

The quantitative ratio between the halogenated hydrocarbon and the gaseous feed mixture of $CH_4$ and $Cl_2$ varies in dependance upon the reaction conditions, upon the heat regulation requirements, and upon the products that one mainly wishes to obtain.

Moreover, the concentration of the solid (calcium fluoride) in the halogenated hydrocarbon in the liquid state, is also related to the type and characteristics of the feeding system used. Finally, the technique which is the object of this invention may be applied either in a single stage fluid bed reactor or in successive stages with more than one fluid bed.

According to one preferred, although not the only, embodiment of the invention, the process is carried out by feeding into the reactor, besides methane, chlorine and, if desired, a part of the halogenated hydrocarbon in gaseous phase, the calcium fluoride in the form of a suspension in part of or in the whole halogenated hydrocarbon in the liquid state. The reaction products are then recovered and separated according to various methods well known in the art.

The pressure at which the reaction is conducted is not a critical parameter and may be maintained at substantially atmospheric values. Thanks to the simple operational conditions, the process turns out to be particularly convenient.

One advantage lies in the possibility of carrying out the chlorofluorination reaction of the methane simultaneously with the granulation of the calcium fluoride, fed in the form of a suspension in the halogenated hydrocarbon in the liquid state, thereby avoiding the preliminary operation of preparing the granular calcium fluoride bed and the corresponding expenditure of the required energy (evaporation, etc.).

Still another advantage lies in the fact that the evaporation of the liquid halogenated hydrocarbon, wherein the calcium fluoride is suspended, is particularly helpful for absorbing the considerable quantity of heat developed by the reaction. As a matter of fact, the chlorofluorination reaction of the methane is exothermic and, thus, when carrying out the process, it is necessary to provide for the dissipation of part of the heat that has been freed. This heat dissipation, carried out by conventional methods known in the art, may be achieved conveniently by suitably regulating the quantity of liquid halogenated hydrocarbon used, whose evaporation thereby contributes to the thermal regulation of the whole system.

A further particularly interesting advantage afforded by this invention resides in the possibility of feeding the calcium fluoride or the product containing it in the most suitable granulometric size, that is, in a particularly fine size (since it is known that the reactivity of the calcium fluoride is related among other things to its size), as actually occurs when operating according to this invention where the calcium fluoride, after the evaporation of the liquid halogenated hydrocarbon wherein it is suspended, finds itself in the reaction medium in particles of fine size having a high reactivity.

Finally, further advantages are represented by the easy feeding of the solid calcium fluoride in suspension in the liquid halogenated hydrocarbon achieved by means of pumps, even when within the reactor there are overpressures, and by the contemporaneous granulation of the calcium fluoride into spheroids particularly suited for the fluid bed technique.

In any event, the calcium fluoride that is not retained in the reactor may be recovered by means of conventional methods and recycled, thereby increasing the granulation yield of the system.

The invention will now be further described through the following examples given by way of illustration:
Two types of tests were carried out:
a. Chlorofluorination of $CH_4$ with chlorine and fluorite, in the presence of a recycle consisting of liquid $CCl_4$ in which the fluorite has been suspended (Examples 1 and 2).
b. Fluorination of $CCl_4$ with fluorite fed in the form of a suspension in one part of the liquid $CCl_4$ (Example 3).

In Example 3, carried out under the same feeding conditions of the fluorite of Examples 1 and 2, but starting from $CCl_4$ and fluorite, it is particularly apparent how there occurs a simultaneous reaction of the fluorite and its granulation, according to the spirit of the invention, even in the presence of halogenated methane derivatives instead of the methane and chlorine of Examples 1 and 2.

Both types of tests started from a fluid bed of fluorite, granulated according to the prior art, into which had been sprayed the fluorite suspension in the liquid recycle.

The apparatus wherein the tests were carried out batchwise consisted of the feeding lines for the reactants, a fluid bed reactor having in its lower part a spray-nozzle, and a product-gathering system.

The feeding lines for $CH_4$, chlorine and nitrogen were of a conventional type and fitted with a flask, a flow-rate meter and a pressure gauge.

The feeding line for the gaseous recycle consisted of a storage vessel, a metering pump, a pressure gauge and an evaporator.

The feeding line for the fluorite suspension in the liquid recycled halogenated hydrocarbon consisted of a storage tank fitted with a stirrer, a metering pump for slurries and a pressure gauge. The different feeding lines discharged together into the sprayer.

The reactor itself was a cylinder with a conical bottom and a diameter of 50 mm, made of Ni alloy, provided with a sheath allowing the temperature to be measured and it was heated electrically from the outside. In the upper part of the reactor there was placed a filter for retaining the smaller particles of solid drawn out of the fluid bed by the gaseous flow.

The sprayer, located immediately upstream of the reactor, was formed of three concentric cylindrical chambers. Through the innermost chamber there was fed the suspension, through the mid chamber there flowed the chlorine kept at room temperature, while into the outermost chamber there was fed the methane, and if desired the methane in admixture with a part of the recycled halogenated hydrocarbon in vapor phase. The sprayer worked also as a mixer for the methane and gaseous recycled halogenated hydrocarbon mixture of the outer chamber and the chlorine of the mid chamber. In the fluorination test of the $CCl_4$ (Example 3) the suspension of fluorite in the liquid $CCl_4$ was fed into the inner chamber similarly to the chlorofluorination tests upon the $CH_4$, into the mid chamber there flowed in nitrogen while the outer chamber, obviously, remained unused.

The collection system for the products consisted of a water-cooled condenser, a washing vessel for washing with water and a washing vessel for washing with NaOH solution. The organic phase collected in the two washing vessels was analyzed by gas chromatography. In the following examples, there was initially loaded into the reactor a mixture of $CaF_2$ and $CaCl_2$ in the form of preformed spherical granules, granulated according to methods well known per se in the prior art.

The mass was maintained fluid during the heating by means of a nitrogen stream, until reaching the operational value. At this point there were fed the reactants and at the same time there was interrupted the feeding of nitrogen (in the fluorination test of $CCl_4$ (Example 3) a certain quantity of nitrogen was also fed during the test).

At the end of the test, on the solid phase present in the reactor a granulometric separation was carried out and an inorganic analysis was carried out on each fraction.

EXAMPLE 1

Chlorofluorination of $CH_4$

| Test conditions: | |
|---|---|
| Temperature | = 500°C. |
| Pressure | = 1 atm. |
| Inside reactor cross-sectional area | = 18.8 sq.cm. |
| Linear feed rate | = 24 cm/sec. |
| Contact time | = 1.05 sec. |
| Molar ratio:recycle/$Cl_2$/$CH_4$ | = 20/4/1 |
| Composition of recycle | = $CCl_4$ |
| Composition of the suspension: | |
| Fluorite | = 11.6% b.w. (grams) |
| Liquid $CCl_4$ | = 88.4% b.w. (grams) |
| Duration of test | = 60 min. |
| Molar ratio:recycle gas/recycle liquid | = 1.07 |

Balance of the solid phase
A) Initial Balance:

| Granulometry | Weight in g | % of b.w. of $CaCl_2$ | % of b.w. of $CaF_2$ | $CaCl_2$ moles | $CaF_2$ moles | total moles |
|---|---|---|---|---|---|---|
| 246–495 Microns | 600 | 92.0 | 8.0 | 4.970 | 0.616 | 5.586 |
| 1–5 Microns | 200(o) | — | 100 | — | 2.563 | 2.563 |
| Total | 800 | | | 4.970 | 3.179 | 8.149 |

(o)This quantity was fed as a suspension

B) Final Balance:

| Granulometry Microns | Weight in g | % b.w. of $CaCl_2$ | % b.w. of $CaF_2$ | $CaCl_2$ moles | $CaF_2$ moles | total moles |
|---|---|---|---|---|---|---|
| 1–5 | 10 (o) | 15.2 | 84.8 | 0.014 | 0.109 | 0.123 |
| 74–175 | 18 | 45.0 | 55.0 | 0.073 | 0.127 | 0.200 |
| 175–246 | 45 | 58.2 | 41.8 | 0.236 | 0.242 | 0.478 |
| 246–495 | 619 | 80.3 | 19.7 | 0.480 | 1.565 | 6.045 |
| 495–701 | 65 | 70.5 | 29.5 | 0.413 | 0.246 | 0.659 |
| 701–991 | 52 | 57.0 | 43.0 | 0.267 | 0.288 | 0.555 |
| Total | 809 | | | 5.483 | 2.577 | 8.060 |

(o)This quantity was collected on the filter located in the upper part of the reactor and it was found that it had the same granulometry as the fluorite fed in suspension.

| Initial moles($CaF_2$+$CaCl_2$) | = 8.149 |
|---|---|
| Final moles ($CaF_2$+$CaCl_2$) | = 8.060 |
| Lost moles ($CaF_2$+$CaCl_2$) | = 0.089 (3.5% with respect to the fluorite fed in suspension). |

To this loss, with regard to the granulation yield of the test, there must be added the quantity of solid collected on the filter placed in the upper part of the reactor, corresponding to 5 percent with respect of the fluorite fed in suspension, wherefore the quantity of fluorite that was granulated amounted to about 91.5 percent of the fed fluorite.

Final moles $CaCl_2$    = 5.483

| Initial moles $CaCl_2$ | = 4.970 |
|---|---|
| Formed moles $CaCl_2$ | = 0.513 (corresponding to a conversion of 20% with respect to the fluorite fed in suspension). |

The quantity of formed chlorofluoromethanes, calculated by means of gas-chromatographic analysis, turned out to be:

0.040 moles of $CF_2Cl_2$
0.904 moles of $CFCl_3$

Thus, the conversion of the $CH_4$ to $CFCl_3$ amounted to 90 percent while the conversion of the $CH_4$ to $CF_2Cl_2$ amounted to 4 percent.

EXAMPLE 2

Chlorofluorination of $CH_4$

| Test Conditions: | |
|---|---|
| Temperature | = 500°C |
| Pressure | = 1 atm. |
| Inside reactor cross-sectional area | = 18.8 sq. cm. |
| Linear feed rate | = 25 cm/sec. |
| Contact time | = 2 sec. |
| Molar ratio: recycle/$Cl_2CH_4$ | = 7/4/1 |
| Composition of recycle | = $CCl_4$ |
| Composition of suspension: | |
| Fluorite | = 12.2% b.w. (grams) |
| Liquid $CCl_4$ | = 87.8% b.w. (grams) |
| Duration of the test | = 45 min. |
| Molar ratio gas recycle/liquid recycle | = 0.67 |

Balance of the solid phase:
A) Initial balance

| Granulometry | Weight in g | % b.w. of $CaCl_2$ | % b.w. of $CaF_2$ | Moles $CaCl_2$ | Moles $CaF_2$ | total moles |
|---|---|---|---|---|---|---|
| 276–495 microns | 1180 | 90.5 | 9.5 | 9.625 | 1.437 | 11.062 |
| 1–5 microns | 150 (o) | — | 100 | — | 1.923 | 1.923 |
| Total | 1330 | | | 9.625 | 3.360 | 12.985 |

(o)This quantity was fed in as a suspension.

B) Final balance:

| Granulometry Microns | Weight in g | % b.w. of $CaCl_2$ | % of b.w. of $CaF_2$ | Moles $CaCl_2$ | Moles $CaF_2$ | Total Moles |
|---|---|---|---|---|---|---|
| 1–5 | 5 (o) | 18.5 | 91.5 | 0.008 | 0.059 | 0.067 |
| 74–175 | 16 | 51.0 | 49.0 | 0.074 | 0.101 | 0.175 |
| 176–246 | 35 | 75.2 | 24.8 | 0.237 | 0.111 | 0.348 |
| 246–495 | 1219 | 87.1 | 12.9 | 9.558 | 2.016 | 11.574 |
| 495–701 | 45 | 85.0 | 15.0 | 0.345 | 0.087 | 0.432 |
| 701–991 | 30 | 80.5 | 19.5 | 0.218 | 0.075 | 0.293 |
| Total | 1350 | | | 10.440 | 2.449 | 12.889 |

(o)This quantity was collected on the filter placed in the upper part of the reactor, and it was found it had the same granulometry as the fluorite fed in suspension.

| Initial moles($CaF_2$+ $CaCl_2$) | = 12.985 |
|---|---|
| Final moles ($CaF_2$+ $CaCl_2$) | = 12.889 |
| Lost moles ($CaF_2$+ $CaCl_2$) | = 0.096 (5% with respect to the fluorite fed in suspension). |

To this loss, with regard to the granulation yield of the test, there must be added the quantity of solid collected on the filter, corresponding to 3.5 percent with respect to the fluorite fed in suspension, wherefore the quantity of fluorite that was granulated amounted to about 91.5 percent of the fed fluorite.

| | | |
|---|---|---|
| Final moles $CaCl_2$ = | 10.440 | |
| Initial moles $CaCl_2$ = | 9.625 | |
| Formed moles $CaCl_2$ = | 0.815 | ((corresponding to a conversion of about 42% with respect to the fluorite fed in suspension). |

The quantity of formed chlorofluoromethanes, calculated from analysis by gas-chromatography, was found to be:

0.058 Moles of $CF_2Cl_2$
1.474 Moles of $CFCl_3$

Wherefore it turned out that the conversion of the $CH_4$ to $CFCl_3$ amounted to 88.8 percent while the conversion of $CH_4$ to $CF_2Cl_2$ amounted to 3.5 percent.

EXAMPLE 3

Fluorination of $CCl_4$
Test Conditions:

| | | |
|---|---|---|
| Temperature | = | 500°C |
| Pressure | = | 1 atm. |
| Inside reactor cross-sectional area | = | 18.8 sq.cm. |
| Linear feed rate | = | 25 cm/sec. |
| Contact time | = | 1 sec. |
| Molar ratio:$CCl_4/N_2$ | = | 2 |
| Composition of the suspension: | | |
| Fluorite | = | 10.3% b.w. (grams) |
| Liquid $CCl_4$ | = | 89.7% b.w. (grams) |
| Duration of the test | = | 56 min. |

Balance of the solid phase
A) Initial balance

| Granulometry in | Weight g | % b.w. $CaCl_2$ | % b.w. $CaF_2$ | Moles $CaCl_2$ | Moles $CaF_2$ | Total moles |
|---|---|---|---|---|---|---|
| 246–495 microns | 592 | 87.2 | 12.8 | 4.651 | 0.970 | 5.621 |
| 1–5 microns | 240 (a) | — | abt. 100% | — | 3.074 | 3.074 |
| Total | 832 | | | 4.651 | 4.044 | 8.695 |

(a)This quantity was fed as a suspension.

B) Final balance:

| Granulometry Microns | Weight in g | % b.w. of $CaCl_2$ | % b.w. of $CaF_2$ | Moles $CaCl_2$ | Moles $CaF_2$ | Total moles |
|---|---|---|---|---|---|---|
| (a)1–5 | 13 | 17.4 | 82.6 | 0.020 | 0.138 | 0.158 |
| 74–175 | 20 | 50.2 | 49.8 | 0.090 | 0.128 | 0.218 |
| 175–246 | 52 | 60.7 | 39.3 | 0.284 | 0.262 | 0.546 |
| 246–495 | 626 | 75.4 | 24.6 | 4.252 | 1.972 | 6.224 |
| 495–701 | 20 | 68.5 | 31.5 | 0.123 | 0.081 | 0.204 |
| 701–991 | 102 | 57.7 | 42.3 | 0.530 | 0.553 | 1.083 |
| 991–1397 | 17 | 56.2 | 43.8 | 0.086 | 0.095 | 0.181 |
| Total | 850 | | | 5.385 | 3.229 | 8.614 |

(a)This quantity was collected on the filter and it was found to have the same granulometry as the initial fluorite fed in suspension.

| | | | |
|---|---|---|---|
| Initial moles | $(CaF_2 + CaCl_2)$ | = 8.695 | |
| Final moles | $(CaF_2 + CaCl_2)$ | = 8.614 | |
| Lost moles | $(CaF_2 + CaCl_2)$ | = 0.081 | (2.6% with respect to the fluorite fed in suspension) |

To this loss, with regard to the granulation yield of the test, there must be added the quantity of solid collected on the filter located in the upper part of the reactor, corresponding to 5.1 percent with respect to the fluorite fed in suspension, wherefore the quantity of fluorite which was granulated amounted to 92.3 percent of the fed fluorite.

| | | |
|---|---|---|
| Final moles $CaCl_2$ | = 5.385 | |
| Initial moles $CaCl_2$ | = 4.651 | |
| Formed moles $CaCl_2$ | = 0.734 | (corresponding to a conversion of 23.1% with respect to the fluorite fed in suspension). |

The quantity of chlorofluoromethanes thus formed, calculated from the gas-chromatographic analysis, turned out to be:

0.080 moles of $CF_2Cl_2$
1.252 moles of $CFCl_3$

Thus, the conversion of the $CCl_4$ to $CFCl_3$ amounted to 9.2 percent and conversion of the $CCl_4$ to $CF_2Cl_2$ amounted to 0.6 percent.

What is claimed is:

1. In a process for the preparation of chlorofluoromethane derivatives by the reaction of a gaseous mixture comprising methane, chlorine and at least one halogenated hydrocarbon selected from the group consisting of chloromethanes, fluoromethanes, chlorofluoromethanes, chloroethanes, or a gaseous mixture comprising tetrachloromethane and the abovesaid halogenated hydrocarbons with calcium fluoride or with a solid substance consisting essentially of $CaF_2$, according to fluid bed techniques, the improvement comprising feeding the solid $CaF_2$ containing substance, at least 90 percent of which has a particle size lower than about 50 microns, in the form of a suspension in at least a portion of said halogenated hydrocarbon, in the liquid state, at a temperature between about 450° and 550° C.

2. A process according to claim 1, wherein the halogenated hydrocarbons consist essentially of halogenated hydrocarbons selected from the class consisting of the reactants, the intermediates, the products and the by-products of the reaction.

3. A process according to claim 1, wherein the halogenated hydrocarbons are selected from the class consisting of $CCl_4$, $CHCl_3$, $CH_2Cl_2$, $CH_3Cl$, $CFCl_3$, $CHF_3$, $CF_2Cl_2$, $CF_3Cl$, $CHFCl_2$, $CHF_2Cl$, $C_2Cl_6$ and $C_2HCl_3$.

4. A process according to claim 1, wherein the calcium fluoride-containing substance is fluorite.

5. A process according to claim 1, wherein the reaction is carried out with a molar ratio of $Cl_2/CH_4$ between about 3.5 and 4.5.

6. A process according to claim 1, wherein the process is carried out in successive stages comprising successive fluid beds.

7. A process according to claim 1, wherein the halogenated hydrocarbon is at least a recycled compound selected from the class consisting of the reactants, the intermediates, the products and the by-products of the reaction.

* * * * *